3,261,859
BASICALLY SUBSTITUTED PHENYL
ACETONITRILE COMPOUNDS
Ferdinand Dengel, Mannheim, Germany, assignor to Knoll A.-G. Chemische Fabriken, Ludwigshafen (Rhine), Germany, a corporation of Germany
No Drawing. Filed Apr. 27, 1962, Ser. No. 190,772
Claims priority, application Germany, Apr. 28, 1961, K 43,596
19 Claims. (Cl. 260—465)

The present invention relates to new and valuable phenyl acetonitrile compounds and more particularly to basically substituted phenyl acetonitrile compounds, and to a process of making and using same.

It is one object of the present invention to provide new and valuable phenyl acetonitriles which are substituted by a basic group.

Another object of the present invention is to provide a simple and effective method of producing such new and valuable basically substituted phenyl acetonitrile compounds.

A further object of the present invention is to provide a valuable and highly effective pharmaceutical composition containing, as active components, such basically substituted phenyl acetonitrile compounds, said composition causing dilatation of the coronary vessels and thus serving as coronary dilator.

Still another object of the present invention is to provide a method of causing dilatation of the coronary vessels and thus being of value in the treatment of disturbances of coronary circulation and in the relief of the pain of acute anginal seizures.

Other objects of the present invention and advantageous features thereof will become apparent as the description proceeds.

In principle the present invention is concerned with basically substituted phenyl acetonitrile compounds of Formula I

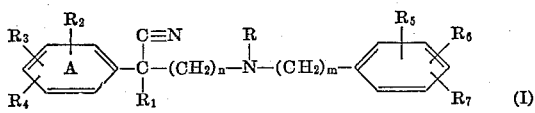

wherein

R is a lower aliphatic hydrocarbon radical;
$R_1$ is hydrogen, a lower alkyl radical, a saturated or unsaturated cyclic or bicyclic hydrocarbon radical, the benzyl radical, or the phenyl radical;
$R_2$, $R_3$, $R_4$, $R_5$, $R_6$, and $R_7$ are hydrogen, halogen, lower alkyl radicals lower alkoxy groups or two of said substituents together forming the methylene dioxy group;
$n$ is an integer between 2 and 4; and
$m$ is an integer between 1 and 3.

These new compounds may be prepared by using for instance, a phenyl acetonitrile of Formula II

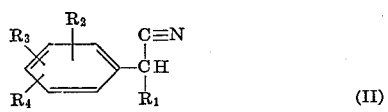

as starting material and reacting said acetonitrile with a compound of Formula III

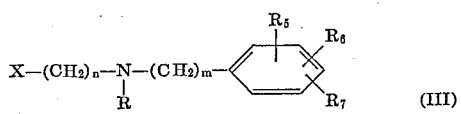

wherein

X is a reactive acid residue and preferably halogen, while R, $R_5$, $R_6$, $R_7$, $n$ and $m$ represent the same substituents and integers as indicated above.

This reaction is preferably carried out in the presence of basic condensing agents which are capable of binding the acid split off during the reaction.

Another method of producing compounds of Formula I, wherein $R_1$ is another substituent than hydrogen consists in introducing such other substituent $R_1$, i.e. a lower alkyl radical, a saturated or unsaturated cyclic or bicyclic hydrocarbon radical, the benzyl radical, or the phenyl radical into a compound of Formula IV

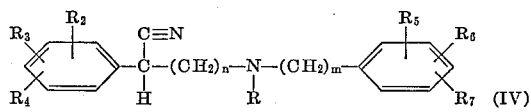

by reacting said compound of Formula IV with a compound of Formula V $$R_8—X \quad (V)$$

wherein $R_8$ is a lower alkyl radical, a saturated or unsaturated cyclic or bicyclic hydrocarbon radical, the benzyl radical, or the phenyl radical and
X is a reactive acid residue and preferably halogen.

It is also possible to combine both methods and condensing a phenyl acetonitrile of Formula VI

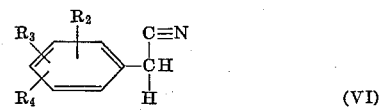

with a compound of Formula III as given above and a compound of Formula V as given above in any desired order whereby it is not necessary to isolate the resulting intermediate products of Formula IV or Formula II wherein $R_1$ is another substituent than hydrogen.

Preferably these reactions are carried out at elevated temperature while stirring vigorously. There are several possibilities of allowing the reaction components to react with each other. According to one method a phenylacetonitrile of Formula II is heated to boiling with a basic condensing agent, preferably with sodium amide, in an organic solvent until development of ammonia ceases. Thereafter, the calculated quantity of the compound of Formula III is slowly added thereto.

Because the corresponding amidine salt, and also polymerization products, may be formed when exposing the primary or secondary nitrile of Formulas VI and II to the action of sodium amide for a prolonged period of time, it is advisable to cause the alkylamino alkyl compound of Formula III and the condensing agent to react simultaneously with the nitrile by gradually adding a mixture of a solution of the compound of Formula III and a suspension of sodium amide to the boiling solution of the phenyl acetonitrile of Formulas VI or II. As a result of such a procedure formation of by-products is markedly suppressed and preferably the desired reaction products are produced.

Another way of avoiding the formation of undesired by-products consists in slowly and gradually adding the suspension of the basic condensing agent to the boiling solution of both reaction components.

When proceeding on a smaller scale, the three reaction components may be mixed with the solvent in the cold and the mixture may then gradually be heated while stirring whereby simultaneous development of ammonia indicates the progress of the reaction.

As basic condensing agents for the reaction according to the present invention there may be used not only sodium amide but also metallic sodium, sodium hydride, sodium hydroxide, potassium amide, lithium amide, or lithium or magnesium compounds of secondary amines, such as lithium diethylamide, as they are described by Ziegler and Ohlinger in "Liebig's Annalen der Chemie," vol. 495, page 84 (1932).

Aromatic hydrocarbons, such as benzene, toluene, or xylene have proved to be the preferred solvents although higher boiling aliphatic ethers are also suitable.

When compounds of Formula IV with a free hydrogen atom in α-position to the nitrile group are used as starting materials for the preparation of the new basically substituted phenyl acetonitriles of Formula I, the above mentioned basic condensing agents and solvents as well as temperature conditions are employed. The reaction components and the basic condensing agent are added in any desired order. As reaction components of Formula V R₀—X, there are used, for instance, aliphatic halides, dialkyl sulfuric acid esters, benzyl halides, cycloalkyl halides, bicyclic halides as well as the corresponding benzene or toluene sulfonic acid esters.

The present invention may be illustrated by the following examples without, however, being limited thereto.

EXAMPLE 1

α-Isopropyl-α-[(N-methyl-N-homoveratryl)-γ-amino propyl]-phenyl acetonitrile In a three-necked flask equipped with a mechanical stirrer, a dropping funnel, and a reflux condenser there are dissolved 47.7 g. of phenyl-α-isopropyl acetonitrile in 400 ml. of toluene. Any water present therein is completely removed by distilling off about 100 ml. of the solvent. 13.5 g. (1.15 x 0.3 moles) of pulverized sodium amide are added to the cooled solution which is then kept boiling under reflux for one hour while stirring. Subsequently a solution of (N-methyl-N-homoveratryl)-γ-amino chloro propane in 100 ml. of toluene which has freshly been prepared from 92 g. (0.3 mole) of its hydrochloride, is added drop by drop to the boiling mixture while stirring vigorously. The solution is kept boiling for two more hours while stirring. The reaction mixture is cooled to room temperature and stirred slowly into 2 l. of ice water. After acidifying with hydrochloric acid, the toluene layer is separated and the aqueous hydrochloric acid solution is diluted with potassium carbonate. The precipitated base is taken up in benzene, the solvent is evaporated, and the residue is distilled in a vacuum. 90 g. of α-isopropyl-α-[(N-methyl - N - homoveratryl) - γ - amino propyl]-phenyl acetonitrile are obtained in the form of a viscous yellow oil. Boiling point: 205–208° C./0.01 mm. Hg; $n_D^{25}$=1.5436. Yield: 76% of the theoretical yield.

The di-oxalate precipitates from ethyl acetate in the form of a jelly-like mass and is converted into pulverulent crystals on recrystallization from alcohol. Melting point: 158–160° C. (corr.).

The citrate, obtained on recrystallization from a mixture of isopropanol and ether, is very hygroscopic and melts at 36° C.

EXAMPLE 2

α-[(N-methyl-N-homoveratryl)-γ-amino propyl]-α,α-diphenyl acetonitrile

The procedure is the same as described in Example 1. 38.6 g. (0.2 mole) of diphenyl acetonitrile in 300 ml. of toluene are heated to boiling under reflux, while stirring, with 9.0 g. (1.15 x 0.2 moles) of pulverized sodium amide. Thereafter, a solution of the chlorinated base, freshly prepared from 61.6 g. (0.2 mole) of (N-methyl-N-homoveratryl)-γ-amino-chloro propane hydrochloride, in 100 ml. of toluene is added drop by drop thereto within two hours. The reaction mixture is worked up as described in Example 1. 62 g. of α-[(N-methyl-N-homoveratryl)-γ-amino propyl]-α,α-diphenyl acetonitrile are obtained in the form of a viscous yellow oil. Boiling point: 241–243° C./0.05 mm. Hg; $n_D^{25}$=1.5747. Yield: 72% of the theoretical yield. On heating an alcoholic solution of the pure base with the equivalent quantity of pulverized sulfamic acid on the water bath, a clear solution is obtained. On cooling said solution, the white, crystalline sulfamate precipitates. Melting point: 133.5–135° C. (corr.). The di-oxalate melts at 155.5–157° C. (corr.) on recrystallization from ethanol.

EXAMPLE 3

α-(Bicyclo[2,2,1]heptene-5-yl-2-methyl)-α-[(N-methyl-N-benzyl)-β-amino ethyl]phenyl acetonitrile The procedure is the same as described in Example 1. The solution of 55.8 g. (0.25 mole) of α-(bicyclo-[2,2,1]-heptane-5-yl-2-methyl)phenyl acetonitrile in 250 ml. of toluene is heated to boiling under reflux with 11.2 g. (1.15 x 0.25 moles) of pulverized sodium amide for one hour. Thereafter, a solution of 45.9 g. (0.25 mole) of (N-methyl - N - benzyl) - β - amino chloro ethane, freshly prepared from its hydrochloride, in 100 ml. of toluene is added drop by drop thereto within 90 minutes. The mixture is kept boiling for three hours and is then worked up as described in Example 1. 59 g. of α - (bicyclo-[2,2,1] - heptene - 5 - yl - 2 - methyl) - α - [N - methyl-N-benzyl) - β - amino ethyl]phenyl acetonitrile are obtained in the form of a very viscous light-yellow oil. Boiling point: 191–194° C./0.01 mm. Hg; $n_D^{25}$=1.5609. Yield: 63% of the theoretical yield. Hydrochloride: Melting point: 217–218.5° C. (corr.), on recrystallization from isopropanol.

EXAMPLE 4

α-Isopropyl-α-[(N-methyl-N-homoveratryl)-γ-amino propyl]-3-chloro-4-ethoxy phenyl acetonitrile The procedure is the same as described in Example 1. 47.4 g. (0.2 mole) of α - isopropyl - (3 - chloro - 4- ethoxy phenyl acetonitrile) dissolved in toluene are heated to boiling with 9.0 g. (1.15 x 0.2 moles) of pulverized sodium amide. The mixture is condensed with 54.3 g. (0.2 mole) of freshly prepared (N - methyl - N - homoveratryl) - γ - amino chloro propane. The reaction mixture is worked up and distilled in a vacuum. 65.2 g. of α - isopropyl - α - [(N - methyl - N - homoveratryl)-γ - amino propyl] - 3 - chloro - 4 - ethoxy phenyl acetonitrile are obtained in the form of a viscous, yellow oil. Boiling point: 232–234° C./0.01 mm. Hg; $n_D^{25}$=1.5460. Yield: 69% of the theoretical yield. Di-oxalate: Melting point: 170–172° C. (corr.), on recrystallization from ethanol.

EXAMPLE 5

α-Isopropyl-α-[(N-methyl-N-homoveratryl)-β-amino ethyl]-3,4-dimethoxy phenyl acetonitrile 109 g. (0.5 mole) of α-isopropyl veratrylcyanide are dissolved in 500 ml. of toluene and the solution is heated to boiling under reflux, while stirring, with 21.5 g. (0.1 x 0.5 mole) of pulverized sodium amide. A solution of 129.0 g. (0.5 mole) of (N-methyl-N-homoveratryl)-β-amino chloro ethane, freshly prepared from its hydrochloride, in 300 ml. of toluene is added drop by drop thereto within one hour. On working up the reaction mixture as described in Example 1, 156 g. of α-isopropyl-α-[(N - methyl - N - homoveratryl) - β - amino ethyl]-3,4-dimethoxy phenyl acetonitrile are obtained in the form of a viscous yellow oil. Boiling point: 230° C./0.01 mm. Hg; $n_D^{25}$=1.5498. Yield: 71% of the theoretical yield. Hydrochloride: Melting point: 181–182.5° C. (corr.), on recrystallization from isopropanol. Di-oxalate: Melting point: 132–135° C. (corr.), on recrystallization from ethanol.

EXAMPLE 6

α-Isopropyl-α-[(N-methyl-N-homoveratryl)-γ-amino propyl]-3,4-dimethoxy phenyl acetonitrile 61.9 g. (0.15 mole) of α - [(N - methyl - N - homoveratryl) - γ - amino propyl] - 3,4 - dimethoxy phenyl acetonitrile are dissolved in 300 ml. of toluene in the reaction vessel described in Example 1. The solution is heated to boiling under reflux with 8.5 g. (1.45 x 0.15 moles) of pulverized sodium amide for one hour while stirring. Thereafter, a solution of 31.4 g. (1.7 x 0.15 moles) of isopropylbromide in 50 ml. of toluene is added drop by drop thereto within 90 minutes and the mixture is kept boiling for four more hours while stirring. The cooled reaction mixture is allowed to run into 1.5 l. of ice water and the mixture is acidified with 20% hydrochloric acid. The aqueous layer is separated and is rendered alkaline by the addition of a solution of potassium carbonate. The base is taken up in warm benzene. The solvent is evaporated and the residue is distilled in a vacuum. 62.6 g. of α - isopropyl - α - [(N-methyl-N-homoveratryl)-γ-amino propyl]-3,4-dimethoxy phenyl acetonitrile are obtained in the form of a light yellow, very viscous oil. Boiling point: 232–235° C./0.01 mm. Hg; $n_D^{25}=1.5460$. Yield: 91.8% of the theoretical yield. Hydrochloride: Melting point: 139.5–140.5° C. (corr.), on recrystallization from a mixture of isopropanol and ethyl acetate.

The starting base, α - [(N - methyl - N - homoveratryl)- γ - amino propyl] - 3,4 - dimethoxy phenyl acetonitrile, is prepared as follows:

177.2 g. (1 mole) of veratrylcyanide are dissolved in 1 l. of toluene in a three-neck flask. 42.9 g. (1.1 moles) of pulverized sodium amide are added. The mixture is heated to boiling under reflux for one hour while stirring and excluding moisture. A solution of the base (N-methyl - N - homoveratryl) - γ - amino chloro propane, freshly prepared from 339.2 g. (1.1 moles) of the hydrochloride, in 1.2 l. of toluene is added drop by drop into said boiling mixture within two hours while stirring vigorously. Heating and stirring are continued for four more hours. After cooling, the reaction mixture is poured into 3 l. of ice water while stirring. The mixture is acidified with 20% hydrochloric acid. The acidified aqueous layer is separated, neutralized by the addition of sodium hydroxide solution, and rendered alkaline by the addition of concentrated potassium carbonate solution. The precipitated oily base is taken up in benzene. On evaporating the solvent, 402 g. of the crude base are obtained in the form of a reddish-brown, viscous oil.

The crude base is dissolved in a mixture of 550 ml. of isopropanol and 650 ml. of ethyl acetate. Gaseous hydrogen chloride is introduced into the solution until it is of weakly acidic reaction. On allowing the mixture to stand at 0° C., 365 g., of α-[(N-methyl-N-homoveratryl)-γ-amino propyl]-3,4-dimethoxy phenyl acetonitrile hydrochloride precipitate as a slightly yellowish crystal powder of the melting point 136–139° C. (corr.). Yield: 81% of the theoretical yield. The pure, white hydrochloride melting at 140–142° C. (corr.) is obtained on recrystallizing the crude salt twice from isopropanol with the addition of decolorizing carbon. The salt is very soluble in water. The base prepared from the hydrochloride in the form of an almost colorless, very viscous oil boils at 233–235° C./0.01 mm. Hg; $n_D^{25}=1.5532$. Di-oxalate, melting point: 123–125° C. (corr.), on recrystallization from acetone and isopropanol.

EXAMPLE 7

α-*Isopropyl*-α-[(*N-methyl-N-homoveratryl*)-γ-*amino propyl*]-*3,4-dimethoxy phenyl acetonitrile*

219.3 g. (1.0 mole) of α-isopropylveratrylcyanide are dissolved in 2 l. of toluene. A solution of (N-methyl-N-homoveratryl)-γ-amino chloro propane, freshly prepared from 339.2 g. (1.1 moles) of the hydrochloride, in 750 ml. of toluene is added thereto. The mixture is heated to boiling whereafter a mixture of 143 g. of a 30% suspension of sodium amide in toluene (corresponding to 42.9 g. of sodium amide=1.1 moles) and 100 ml. of toluene is added drop by drop thereto while stirring. The dropping funnel is fitted with a special mechanical stirrer in order to prevent settling of the sodium amide suspension. Boiling of the mixture is continued for three hours. The cooled reaction mixture is then allowed to run into 6 l. of ice water while stirring and is acidified by the addition of hydrochloric acid. The aqueous hydrochloric acid layer is rendered alkaline and the precipitated crude base is taken up in benzene. After evaporating the solvent, 427 g. of the crude base are obtained in the form of a yellow oil.

Hydrochloride, melting point: 139.5–140.5° C. (corr.), on recrystallization from a mixture of isopropanol and ethyl acetate. The melting point of a mixture with the hydrochloride obtained according to Example 6 does not show any depression. Di-oxalate, melting point: 150–152° C. (corr.), on recrystallization from ethanol. Base: The base, prepared by treating the pure hydrochloride with dilute sodium hydroxide solution, boils at 232–235° C./0.01 mm. Hg. It is a pale yellow, very viscous oil; $n_D^{25}=1.5460$. The same compound is obtained in the same yield by diluting the boiling toluene solution of α-isopropyl veratrylcyanide drop by drop, while stirring, with a mixture of a 15% suspension of sodium amide in toluene and an about 25% solution of the base (N-methyl-N-homoveratryl)-γ - amino chloro propane in toluene and working up the reaction mixture as described above.

EXAMPLE 8

α-*Isopropyl*-α-[(*N-methyl-N-homoveratryl*)-γ-*amino propyl*]-*3,4-dimethoxy phenyl acetonitrile*

32.9 g. (0.15 mole) of α-isopropyl veratrylcyanide and 23.4 g. (1.2 x 0.15 moles) of a 30% suspension of sodium amide in toluene are added to a solution of (N-methyl-N-homoveratryl)-γ-amino chloropropane, freshly prepared from 42.6 g. (0.15 mole) of its hydrochloride. While stirring vigorously, the temperature of the mixture is allowed to increase gradually to the boiling point within 80 minutes. Generation of ammonia sets in at about 45° C. and is completed after 30 minutes of continuous boiling. The mixture is kept boiling for four more hours, while stirring, and is worked up as described hereinabove. 53.4 g. of α - isopropyl - α - [(N-methyl-N-homoveratryl)-γ-amino propyl] - 3,4 - dimethoxy phenyl acetonitrile are obtained in the form of a pale yellow, very viscous oil. Boiling point: 233–236° C. 0./0.02 mm. Hg. Yield: 77% of the theoretical yield. Hydrochloride, melting point: 139.5–140.5° C. (corr.), on recrystallization from a mixture of isopropanol and ethyl acetate. The compound has proved to be identical with the hydrochlorides of Examples 6 and 7 by the melting point of their mixtures.

EXAMPLE 9

α-*Isopropyl*-α-[(*N-methyl-N-4-chlorophenyl-β-ethyl*)- γ-*amino propyl*]-*3,4-dimethoxy phenyl acetonitrile*

9.0 g. (1.15 x 0.2 moles) of sodium amide in the form of its 15% suspension in toluene are added drop by drop, while stirring, to the boiling mixture of 43.8 g. (0.2 mole) of α-isopropyl veratrylcyanide and 49.2 g. (0.2 mole) of (N-methyl-N-4-chlorophenyl-β-ethyl)-γ-amino chloro propane, freshly prepared from its hydrochloride, dissolved in 400 ml. of toluene, within two hours. On working up the reaction mixture as described in Example 7, 63.2 g. of α-isopropyl-α-[(N-methyl-N - 4 - chlorophenyl-β-ethyl)-γ-amino propyl]-3,4 - dimethoxy phenyl acetonitrile are obtained. Boiling point: 220–225° C./0.3 mm. Hg; $n_D^{25}=1.5475$. Yield: 74% of the theoretical yield.

Hydrochloride, melting point: 141.5° C. (corr.). Prepared by introducing gaseous hydrogen chloride into the acetone solution of the base.

EXAMPLE 10

α-*Isobutyl*-α-[(*N-methyl-N-homoveratryl*)-β-*amino ethyl*]-*3,4-dimethoxy phenyl acetonitrile*

On adding the solution of the free base freshly prepared from 75.5 g. (0.25 mole) of the hydrochloride of (N-methyl-N-homoveratryl) - β - amino chloroethane, in 100 cc. of toluene drop by drop into the boiling mixture of 58.3 g. (0.25 mole) of α-isobutyl veratrylcyanide, 11.2 g. (1.15 x 0.25 moles) of pulverized sodium amide, and 250 ml. of toluene within one hour while stirring and boiling under reflux, continuing boiling for three hours, and working up the reaction mixture, 81 g. of α-isobutyl-α-[(N-methyl-N-homoveratryl)-β-amino ethyl] - 3,4 - dimethoxy phenyl acetonitrile are obtained. Boiling point: 225–228° C./0.01 mm. Hg; $n_D^{25}$=1.5475. Yield: 70% of the theoretical yield.

Hydrochloride, melting point: 169–171° C. (corr.), on recrystallization from isopropanol.

EXAMPLE 11

*α-Isobutyl-α-[(N-methyl-N-homoveratryl)-γ-amino propyl]-3,4-dimethoxy phenyl acetonitrile*

A mixture of 58.3 g. (0.25 mole) of α-isobutyl veratrylcyanide, 10.8 g. (1.1 x 0.25 moles) of pulverized sodium amide, and 250 ml. of toluene is heated to boiling under reflux for 1 hour while stirring. Thereafter, 67.9 g. (0.25 mole) of (N-methyl-N-homoveratryl)-γ-amino chloropropane in 100 ml. of toluene are added drop by drop thereto according to the procedure described in Example 1. After working up the reaction mixture, 77 g. of α-isobutyl-α-[(N-methyl-N-homoveratryl) - γ - amino propyl]-3,4-dimethoxy phenyl acetonitrile are obtained. Boiling point: 220–224° C./0.02 mm. Hg; $n_D^{25}$=1.5428. Yield: 66% of the theoretical yield. Di-oxalate, melting point: 181–183° C. (corr.), on recrystallization from a mixture of isopropanol and acetone.

By proceeding according to Example 6 and reacting isopropylbromide with α-[(N-methyl-N-homoveratryl) - γ-amino propyl]phenyl acetonitrile or, respectively, with α-[(N-methyl-N-homopipyeronyl)-γ-amino propyl] - 3,4-dimethoxy phenyl acetonitrile, there are obtained the corresponding α-isopropyl compounds. The starting materials are obtained by proceeding as follows:

EXAMPLE 12

*α-[(N-methyl-N-homoveratryl)-γ-amino propyl]phenyl acetonitrile*

117.1 g. (1 mole) of benzylcyanide and the base (N-methyl-N-homoveratryl)-γ-amino chloro propane freshly prepared from 338.8 g. (1.1 moles) of its hydrochloride (melting point: 112–114° C., corr.), are dissolved in 1200 ml. of toluene. 42.9 g. (1.1 moles) of sodium amide in the form of a 15% suspension in toluene are added to the above mentioned solution within one hour while boiling under reflux and stirring vigorously. After the addition is completed, vigorous evolution of ammonia gradually ceases. Boiling is continued for two more hours while stirring. The mixture is allowed to cool and is poured with stirring into 2 l. of icewater. After acidifying with 20% hydrochloric acid, the benzene layer is separated. Potassium carbonate solution is added to the aqueous layer. The precipitated base is taken up in benzene, the solvent is evaporated, and the residue is distilled in a vacuum. 258 g. of α-[(N-methyl-N-homoveratryl)-γ-amino propyl]phenyl acetonitrile are obtained in the form of a viscous oil. Boiling point: 203–205° C./0.01 mm. Hg; $n_D^{25}$=1.5506. Yield: 79% of the theoretical yield.

Hydrochloride, melting point: 125–127° C. (corr.), on recrystallization from a mixture of isopropanol and ethyl acetate.

EXAMPLE 13

*α-[(N-methyl-N-homopiperonyl)-γ-amino propyl]-3,4-dimethoxy phenyl acetonitrile*

53.1 g. (0.3 mole) of veratrylcyanide are dissolved in 500 ml. of toluene. 12.9 g. (1.1 moles) of pulverized sodium amide are added thereto and the mixture is heated to boiling under reflux for one hour. While stirring is continued, a solution of (N-methyl-N-homopiperonyl)-γ-amino propane, freshly prepared from 87.6 g. (1.1 moles) of its hydrochloride, in 150 ml. of toluene is added drop by drop to the boiling mixture within one hour. Heating is continued for four more hours while stirring. The cooled reaction mixture is slowly poured into 2 l. of icewater and acidified by the addition of hydrochloric acid. The benzene layer is separated. The aqueous hydrochloric acid layer is rendered alkaline by the addition of sodium hydroxide solution and concentrated potassium carbonate solution. The precipitated base is taken up in benzene, the solvent is evaporated, and the oily residue is distilled in a vacuum. 90.2 g. of α-[(N-methyl-N-homopiperonyl)-γ-amino propyl]-3,4-dimethoxy phenyl acetonitrile are obtained in the form of a yellow, viscous oil. Boiling point: 223° C./0.01 mm. Hg; $n_D^{25}$=1.5720. Yield: 76% of the theoretical yield.

Di-oxalate, melting point: 166–167° C. (corr.), on recrystallization from ethanol.

Other basically substituted phenyl acetonitriles are prepared in an analogous manner. The following examples illustrate such compounds whereby only their formulas, the boiling points of the bases, and the $n_D^{25}$-values are given:

EXAMPLE 14

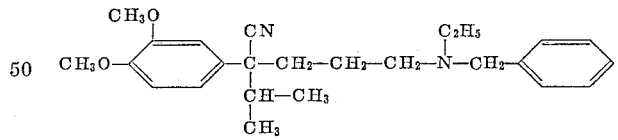

Boiling point: 215–220° C./0.05 mm. Hg; $n_D^{25}$=1.5416.

EXAMPLE 15

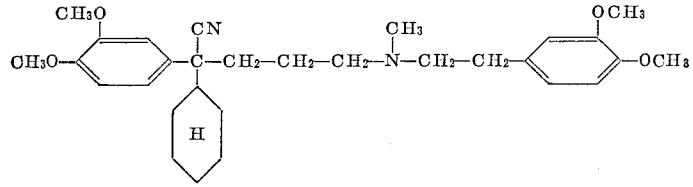

Boiling point: 249–250° C./0.01 mm. Hg; $n_D^{25}$=1.5492.

EXAMPLE 16

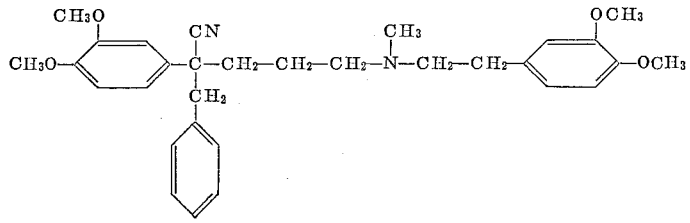

Boiling point: 245–250° C./0.05 mm. Hg; $n_D^{25}$ = 1.5648.
EXAMPLE 17
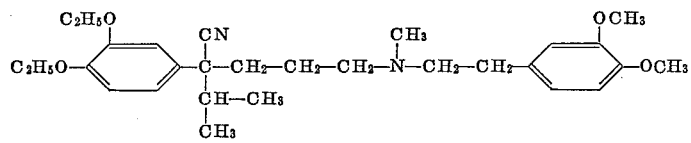
Boiling point: 245–250° C./0.05 mm. Hg; $n_D^{25}$ = 1.5370.
EXAMPLE 18
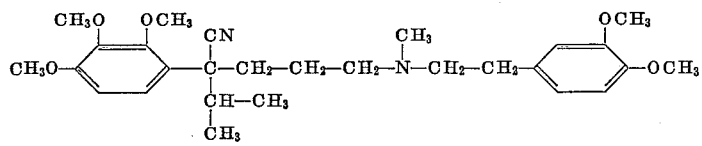
Boiling point: 240–245° C./0.02 mm. Hg; $n_D^{25}$ = 1.5428.
EXAMPLE 19
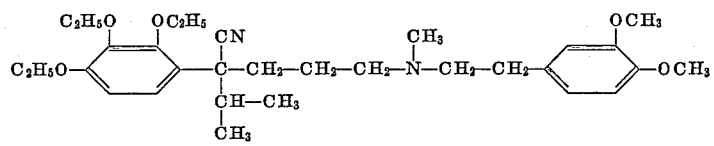
Boiling point: 243–248° C./0.02 mm. Hg; $n_D^{25}$ = 1.5306.
EXAMPLE 20
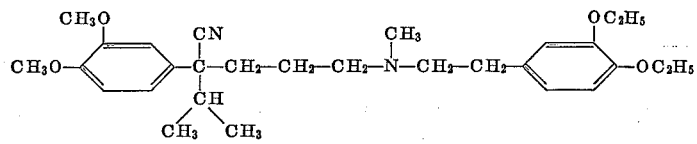
Boiling point: 240–250° C./0.04 mm. Hg; $n_D^{25}$ = 1.5362.
EXAMPLE 21
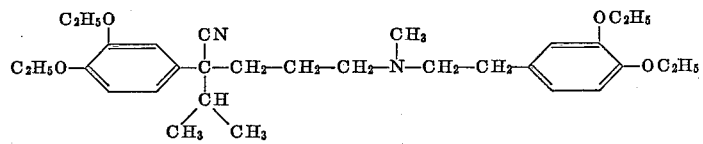
Boiling point: 235–242° C./0.03 mm. Hg; $n_D^{25}$ = 1.5278.
EXAMPLE 22
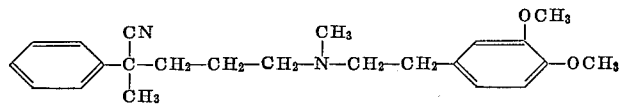
Boiling point: 195–196° C./0.03 mm. Hg; $n_D^{25}$ = 1.538.
EXAMPLE 23
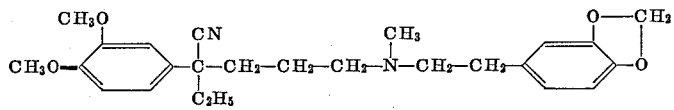
Boiling point: 237–238° C./0.02 mm. Hg; $n_D^{25}$ = 1.5494.
EXAMPLE 24
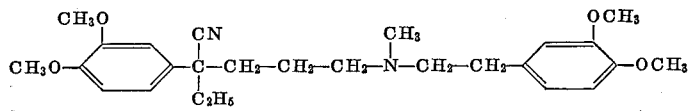

Boiling point: 220–222° C./0.005 mm. Hg; $n_D^{25}=1.5470$.

EXAMPLE 25

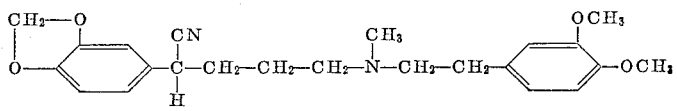

Boiling point: 230–235° C./0.005 mm. Hg; $n_D^{25}=1.5561$.

EXAMPLE 26

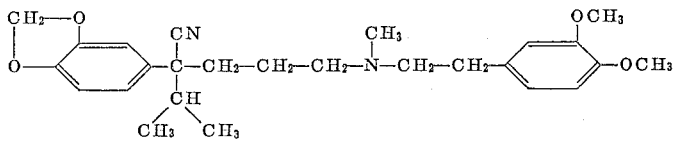

Boiling point: 200–210° C./0.001 mm. Hg; $n_D^{25}=1.5462$.

EXAMPLE 27

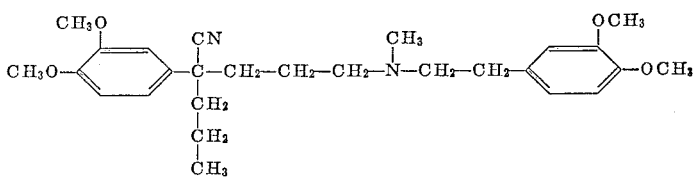

Boiling point: 230° C./0.01 mm. Hg; $n_D^{25}=1.5430$.

EXAMPLE 28

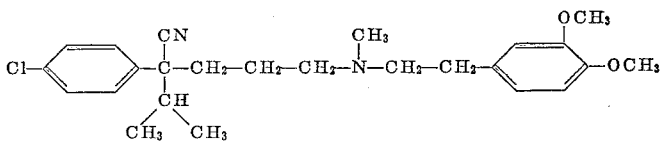

Boiling point: 208° C./0.02 mm. Hg; $n_D^{25}=1.5471$.

These compounds are produced either by reacting the corresponding aralkyl substituted secondary alkylamine carrying at its terminal carbon atom a halogen atom and reacting said halogenated base with the respective α-bis-substituted acetonitrile as described in Examples 1 to 5 and 7 to 11 or by introducing a hydrocarbon radical into the respective basically substituted phenyl acetonitrile compound having only one substituent and a free hydrogen atom at the α-carbon atom of the acetonitrile group as described in Example 6. For instance, the compound of Example 14 is prepared by reacting α-[(N-alkyl-N-benzyl)-γ-amino propyl]-3,4-dimethoxy phenyl acetonitrile with isopropylbromide while the compounds of Examples 15 to 19 are prepared by reacting α-[(N-methyl-N-homoveratryl)-γ-amino propyl]-3,4-dimethoxy phenyl acetonitrile (Examples 15 and 16), α-[(N-methyl-N-homoveratryl)-γ-amino propyl]-3,4-di-ethoxy phenyl acetonitrile (Example 17), α-[(N-methyl-N-homoveratryl)-γ-amino propyl]-2,3,4-trimethoxy phenyl acetonitrile (Example 18), or respectively, α-[(N-methyl-N-homoveratryl)-γ-amino propyl]-2,3,4-triethoxy phenyl acetonitrile (Example 19) with cyclohexylbromide (Example 15), benzylbromide (Example 16), or, respectively, isopropylbromide (Examples 17 to 19).

As stated above, the new compounds produce noteworthy pharmacodynamic effects and cause dilatation of the coronary vessels, thus being useful as coronary dilators. The preferred compound of the highest activity of the basically substituted phenyl acetonitriles according to the present invention is the compound of Examples 6 to 8, i.e., α-isopropyl-α-[(N - methyl - N - homoveratryl)-γ-amino propyl]-3,4-dimethoxy phenyl acetonitrile.

Extensive pharmacological and clinical tests have been carried out with said compound which show that it significantly increases the blood flow in the coronary vessels and, at the same time, increases the oxygen content of the venous heart blood without any substantial change in blood pressure and heart rate. Minute volume of the blood and a trial blood pressure remain unchanged, the difference in oxygen between aortic blood and venous coronary blood diminishes, and the oxygen content increases in the sinus coronarius.

The coronary blood flow was determined by various methods on dogs, namely by means of the sinus balloon catheter or, respectively, by means of Shiply's rotameter in dogs with exposed thorax, or by means of a heart catheter in dogs with closed thorax. It was found that dilatation of the coronary vessels sets in on intravenous administration of 0.1 mg./kg. Coronary dilatation is pronounced with 0.15 mg./kg. and surpasses several times the effect of papaverine, theophylline, and other coronary dilators. α-Isopropyl-α-[(N-methyl-N-homoveratryl)-γ-amino propyl]-3,4-dimethoxy phenyl acetonitrile which will be designated hereinafter as "D365" has a coronary dilating effect which is about 100 times stronger than that of papaverine.

A steep increase in the coronary blood flow is observed 15 seconds to 20 seconds after injection. The maximum is attained after 40 seconds to 60 seconds, i.e. within a relatively short period of time. Said maximum remains substantially unchanged for a prolonged period of time. Administration of 0.2 mg./kg. causes an increase in blood flow amounting to 100% to 300%. Within about 20 minutes to 40 minutes the coronary blood flow returns to its initial value. Thus optimum effects are achieved on intravenous administration of 0.1 mg./kg. to 0.2 mg./kg.

The oxygen content of the coronary sinus blood increases also considerably within 5 seconds to 7 seconds due to the onset of the increased blood flow in the coronary vessels. The maximum values achieved by administration of D365 are between 10% and 16% by volume, of oxygen. Subsequently the venous oxygen content decreases at the approximate rate of decrease in the coronary blood flow and attains its initial value. In contrast thereto the oxygen content of the arterial blood does not show any significant change. The heart rate is not substantially affected with a dose of 0.2 mg./kg. The arterial blood pressure decreases slightly but attains its initial value 10 minutes after injection.

Lactic acid determinations show that the lactic acid balance in the arteries and veins remains negative, i.e. the venous lactic acid content is lower than the arterial lactic acid content. Thus any glycolytic effects on the myocardium can be excluded. These tests clearly show that the heart metabolism is not adversely affected.

On circulating a solution of D365 through the isolated rabbit heart according to the method of Langendorff, it was observed that perfusion of such a small amount as 0.01 γ/ml. causes already an increase in the rate of flow. Thereby, the heart rate is not affected and the contraction intensity is not changed. Thus a smaller amount of oxygen is withdrawn from the blood for heart metabolism as a result of the increase in blood flow due to the action of D365 so that more oxygen at a higher partial pressure is supplied to the venous terminal ramification of the capillaries.

A dose of 0.5 mg./kg. perfused through the isolated rabbit ear according to the method of Krakow and Pissemski results in a 100% increase of the flow and eliminates vaso-constrictor effects.

On analyzing blood circulation according to the method of Wezler and Boeger and in perfusion tests with hind-extremities of dogs, it was found that doses up to 0.2 mg./kg, do not produce substantial changes in the systemic circulation. Only when administering higher doses, increases in the peripheral blood flow and the heart rate and lowering of the blood pressure are observed. The musculotropic spasmolytic effects of D365 far surpass the spasmolytic properties of papaverine as can be demonstrated in tests regarding its effect on blood circulation in dogs, on the ganglionic synapses in cats as well as in tests with guinea pig intestines and isolated stomach preparations.

No metabolic disturbances were observed when testing the effect of D365 on the respiratory enzymes in liver sections of rats and fresly prepared rat liver mitochondrias or when determining its amino oxidase activity in homogenized brain preparations of rats.

The results of toxicological investigations of D365 are given in the following table wherein the dose is indicated in mg./kg. which kills 50% of the tested animals ($LD_{50}$):

| Test Animal | Administered | | Intraperitoneally | Orally |
|---|---|---|---|---|
| | Intravenously | Subcutaneously | | |
| Mouse | 7.6 | 68.0 | 68.0 | 163.0 |
| Rat | 16.0 | 107.0 | 67.0 | 114.0 |

When comparing said $LD_{50}$ with the threshold doses which cause lowering of the blood pressure, i.e. 0.5 mg./kg. on intravenous administration; 2 mg./kg. on subcutaneous administration; 5 mg./kg. on oral administration, the compound D365 has a very favorable therapeutic index between 1:34 and 1:50. The compound is well tolerated systematically as well as locally. Its coronary effective doses are lower than the blood pressure lowering doses.

Compound D365 does not cause disturbances of growth, feed consumption, and feed utilization of rats even when given orally in doses of 10 mg./kg. daily for 12 weeks.

Continuous checking of the blood picture did not show deviations from the normal picture with respect to erythrocytes and leucocytes as well as to the differential blood count.

Analysis of the urine for albumin, sugar, urobilinogen, bilirubin, and sediment did not show pathological deviations from the physiological normals on observation for a prolonged period of time.

Likewise, histological examination of various organs of rats treated for 12 weeks with 10 mg./kg. daily per os, such as heart muscle, lungs, liver, spleen, kidneys, suprarenal glands, small intestines, large intestines, genital organs, brain, and bone marrow, showed normal results. Likewise, oral adminstration of 10 mg./kg. daily in dogs for 12 weeks did not result in any abnormal behavior of the animals or in changes in the blood picture.

Furthermore it has been found that the activity of D365 can be considerably increased by simultaneous administration of small doses (about 0.25 mg./kg.) of adenosine triphosphate and that likewise the activity of adenosine triphosphate can be improved by administration of D365.

The compounds according to the present invention are preferably administered orally. A dose of one to two tablets containing about 20 mg. thereof three times daily has proved to produce satisfactory results. The maintenance dose is about one tablet of about 20 mg. given three times daily. The dose may vary of course. The daily dose is between about 30 mg. and about 250 mg. subdivided in three to four single doses.

Intravenous and intramuscular injection may also be employed as mode of administration. For this purpose aqueous or saline solutions are prepared and used.

Rectal application in the form of suppositories is also possible.

As stated above, the new compound according to the present invention are preferably administered orally in the form of tablets, pills, powders, capsules, solutions, emulsions, suspensions, dispersions, and in any other suitable form. They are preferably not used as such, but are diluted with suitable diluting agents, thus, allowing better and more economical use to be made thereof.

In the case of powders, fine, uniform dispersions of the new compounds within the diluting agent is of importance. Such a fine dispersion can be achieved, for instance, by mixing and milling the new compounds with a solid, pulverulent extending agent to the desired fineness, or by impregnating the already milled, finely powdered, solid carrier with a solution of the active compound in water, or a water-miscible solvent and then removing the water or solvent.

As solid carriers, which are suitable for the manufacture of useful pharmaceutical preparations, various inert pulverulent distributing agents as they are conventionally used in pharmaceutical compounding may be employed.

When preparing tablets, pills, powders, and the like, the commonly used diluting agents, binders, lubricants, and the like are added, such as sugar, lactose, talcum, starch, pectins; as binders gelatin, gum arabic, methyl cellulose, yeast extract, agar, tragacanth; and as lubricating agents, magnesium stearate, stearic acid, and others.

It is understood that other acid addition salts than those mentioned and described hereinabove may be prepared, for instance, acid addition salts with sulfuric acid, sulfamic acid, phosphoric acid, hydrobromic acid, and other inorganic acids as well as with succinic acid, tartaric acid, malonic acid, maleic acid, malic acid, benzoic acid, phthalic acid, nicotinic acid, and other organic acids, provided the respective salts are pharmaceuticaly acceptable and substantially well tolerated in the doses administered.

Of course, many changes and variations in the starting materials and reactants, in the basic condensing agents and solvents, in the reaction conditions, temperature, and duration, in the methods or working up the reaction mixture and of isolating and purifying the reaction products and their acid addition salts, and the like may be made by those skilled in the art in accordance with the principles set forth herein and in the claims annexed hereto.

I claim:
1. The compound of the formula

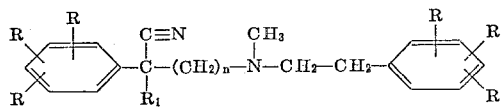

in which
R₁ is a member selected from the group consisting of lower alkyl, cyclohexyl, and phenyl,
R is hydrogen and at least one of the following: chlorine, lower alkoxy, lower alkyl, and $n$ is an integer from 2 to 3, inclusive,
or its pharmaceutically acceptable acid addition salts.

2. The compound of the formula

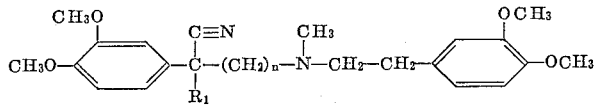

in which
$n$ is an integer from 2 to 3, inclusive, and
R₁ is a member selected from the group consisting of lower alkyl, cyclohexyl, and phenyl,
or its pharmaceutically acceptable acid addition salts.

3. The α-lower alkyl-α-[(N-lower alkyl-N-lower alkyl phenyl)-amino lower alkyl]-3,4-di-lower alkoxy phenyl acetonitrile.

4. The α-lower alkyl-α-{[N-lower alkyl-N-(3,4-di-lower alkoxy phenyl)]amino lower alkyl}-3,4-di-lower alkoxy phenyl acetonitrile.

5. The α-lower alkyl-α-[(N-methyl-N-homoveratryl)-γ-amino propyl]-3,4-dimethoxy phenyl acetonitrile.

6. The α-lower alkyl-α-[(N-methyl-N-homoveratryl)-amino lower alkyl]-3,4-dimethoxy phenyl acetonitrile wherein the lower alkyl radical is one of the following: β-ethyl and γ-propyl.

7. The compound α-isopropyl-α-[(N-methyl-N-homoveratryl)-γ-amino propyl]-3,4-dimethoxy phenyl acetonitrile or its pharmaceutically acceptable acid addition salts.

8. α-Isopropyl-α-[(N-methyl-N-homoveratryl)-γ-amino propyl]-3,4-dimethoxy phenyl acetonitrile.

9. α-Isopropyl-α-[(N-methyl-N-homoveratryl)-γ-amino propyl]phenyl acetonitrile.

10. α-Isopropyl-α-[(N-methyl-N-homoveratryl)-γ-amino propyl]-3-chloro-4-ethoxy phenyl acetonitrile.

11. α-Isopropyl-α-[(N-methyl-N-homoveratryl)-β-amino ethyl]-3,4-dimethoxy phenyl acetonitrile.

12. α-Isobutyl-α-[(N-methyl-N-homoveratryl)-β-amino ethyl]-3,4-dimethoxy phenyl acetonitrile.

13. α-Isopropyl-α-[(N-methyl-N-4-chloro phenyl-β-ethyl)-γ-amino propyl]-3,4-dimethoxy phenyl acetonitrile.

14. α-Isobutyl-α-[(N-methyl-N-homoveratryl)-γ-amino propyl]-3,4-dimethoxy phenyl acetonitrile.

15. α-Cyclohexyl-α-[(N-methyl-N-homoveratryl)-γ-amino propyl]-3,4-dimethoxy phenyl acetonitrile.

16. α-Phenyl-α-[(N-methyl-N-homoveratryl)-γ-amino propyl]-3,4-dimethoxy phenyl acetonitrile.

17. The pharmaceutically acceptable acid addition salts of α-isopropyl-α-[(N-methyl-N-homoveratryl)-γ-amino propyl]-3,4-dimethoxy phenyl acetonitrile.

18. The hydrochloride of α-isopropyl-α-[(N-methyl-N-homoveratryl)-γ-amino propyl]-3,4-dimethoxy phenyl acetonitrile.

19. The sulfate salt of α-isopropyl-α-[(N-methyl-N-homoveratryl)-γ-amino propyl]-3,4-dimethoxy phenyl acetonitrile.

References Cited by the Examiner

UNITED STATES PATENTS

| | | | |
|---|---|---|---|
| 2,268,108 | 12/1941 | Collie | 260—465 |
| 2,446,804 | 8/1948 | Bergel et al. | 260—465 |
| 2,486,794 | 11/1949 | Meischer et al. | |
| 2,527,527 | 10/1950 | Buck et al. | 260—340.5 |
| 3,116,311 | 12/1963 | Klosa | 260—465 |

CHARLES B. PARKER, *Primary Examiner.*

IRVING MARCUS, *Examiner.*

DALE R. MAHANAND, *Assistant Examiner.*